US012014217B2

United States Patent
Mitra et al.

(10) Patent No.: US 12,014,217 B2
(45) Date of Patent: Jun. 18, 2024

(54) SCHEDULING AND CONTROL OF EXECUTABLE JOBS OVER COMPUTE INSTANCES

(71) Applicant: Adobe Inc., San Jose, CA (US)

(72) Inventors: Subrata Mitra, Bangalore (IN); Sunav Choudhary, Kolkata (IN); Shaddy Garg, Distt. Moga (IN); Anuj Jitendra Diwan, Austin, TX (US); Piyush Kumar Maurya, Bareilly (IN); Arpit Aggarwal, Amsterdam (NL); Prateek Jain, Shamli (IN)

(73) Assignee: Adobe Inc., San Jose, CA (US)

( * ) Notice: Subject to any disclaimer, the term of this patent is extended or adjusted under 35 U.S.C. 154(b) by 415 days.

(21) Appl. No.: 17/538,663

(22) Filed: Nov. 30, 2021

(65) Prior Publication Data

US 2023/0168941 A1 Jun. 1, 2023

(51) Int. Cl.
*G06F 9/44* (2018.01)
*G06F 9/50* (2006.01)
*G06F 18/214* (2023.01)
*G06N 20/00* (2019.01)

(52) U.S. Cl.
CPC .......... *G06F 9/5038* (2013.01); *G06F 9/5044* (2013.01); *G06F 9/5055* (2013.01); *G06F 9/5088* (2013.01); *G06F 18/214* (2023.01); *G06N 20/00* (2019.01)

(58) Field of Classification Search
CPC .................................................. G06F 9/5038
USPC ......................................................... 718/104
See application file for complete search history.

(56) References Cited

U.S. PATENT DOCUMENTS

| | | | |
|---|---|---|---|
| 10,552,774 B2 | 2/2020 | Shih et al. | |
| 2013/0139170 A1* | 5/2013 | Prabhakar | G06F 9/4893 718/104 |
| 2021/0165653 A1* | 6/2021 | Bishop | G06F 8/77 |

(Continued)

FOREIGN PATENT DOCUMENTS

| | | |
|---|---|---|
| CN | 104965755 A | 10/2015 |
| CN | 112231091 A | 1/2021 |

OTHER PUBLICATIONS

"Spot", NetApp, Inc. [online][retrieved Oct. 13, 2021]. Retrieved from the Internet <https://spot.io/>., 2020, 11 pages.

(Continued)

*Primary Examiner* — Timothy A Mudrick
(74) *Attorney, Agent, or Firm* — FIG. 1 Patents

(57) ABSTRACT

A resource control system is described that is configured to control scheduling of executable jobs by compute instances of a service provider system. In one example, the resource control system outputs a deployment user interface to obtain job information. Upon receipt of the job information, the resource control system communicates with a service provider system to obtain logs from compute instances implemented by the service provider system for the respective executable jobs. The resource control system uses data obtained from the logs to estimate utility indicating status of respective executable jobs and an amount of time to complete the executable jobs by respective compute instances. The resource control system then employs a machine-learning module to generate an action to be performed by compute instances for respective executable jobs.

20 Claims, 8 Drawing Sheets

(56) References Cited

U.S. PATENT DOCUMENTS

2021/0173719 A1* 6/2021 Chester .................. G06F 9/455
2022/0374276 A1 11/2022 Mitra et al.

OTHER PUBLICATIONS

"Spot Fleet", Amazon Web Services [online][retrieved Oct. 13, 2021]. Retrieved from the Internet <https://docs.aws.amazon.com/AWSEC2/latest/UserGuide/spot-fleet.html>., 2018, 1 page.

"U.S. Application as Filed", U.S. Appl. No. 17/324,692, filed May 19, 2021, 50 pages.

Ali-Eldin, Ahmed et al., "SpotWeb: Running Latency-sensitive Distributed Web Services on Transient Cloud Servers", HPDC '19: Proceedings of the 28th International Symposium on High-Performance Parallel and Distributed Computing [retrieved Sep. 29, 2021]. Retrieved from the Internet <http://www-rts.cs.umass.edu/publications/pdf/hpdc19.pdf>., Jun. 17, 2019, 12 Pages.

Ettun, Yochay, "Save up to 80% in cloud costs when building machine learning models", Cnvrg.io [online][retrieved Oct. 13, 2021]. Retrieved from the Internet <https://cnvrg.io/save-in-cloud-costs/>., 2020, 13 pages.

Fukunaga, Takuro et al., "Stochastic Submodular Maximization with Performance-Dependent Item Costs", AAAI-19, IAAI-19, EAAI-20 vol. 33, No. 1 [retrieved Nov. 16, 2021]. Retrieved from the internet <https://ojs.aaai.org/index.php/AAAI/article/view/3961>., Jul. 17, 2019, 10 Pages.

Gupta, Anupam et al., "Approximation Algorithms for Correlated Knapsacks and Non-martingale Bandits", FOCS '11: Proceedings of the 2011 IEEE 52nd Annual Symposium on Foundations of Computer Science [retrieved Nov. 16, 2021]. Retrieved from the internet <http://www.contrib.andrew.cmu.edu/~ravi/focs11.pdf>., Oct. 22, 2011, 35 Pages.

Harlap, Aaron et al., "Tributary: spot-dancing for elastic services with latency SLOs", USENIX ATC '18: Proceedings of the 2018 USENIX Conference on Usenix Annual Technical Conference [retrieved Sep. 29, 2021]. Retrieved from the Internet <https://www.pdl.cmu.edu/PDL-FTP/BigLearning/CMU-PDL-18-102.pdf>., Jul. 11, 2018, 22 Pages.

Sharma, Prateek et al., "Portfolio-driven Resource Management for Transient Cloud Servers", Proceedings of the ACM on Measurement and Analysis of Computing Systems, vol. 1 No. 1 [retrieved Sep. 29, 2021]. Retrieved from the Internet <https://people.cs.umass.edu/~prateeks/papers/exosphere.pdf>., Jun. 13, 2017, 23 Pages.

U.S. Appl. No. 17/324,692, "Notice of Allowance", U.S. Appl. No. 17/324,692, filed Oct. 18, 2023, 7 pages.

* cited by examiner

SCHEDULING AND CONTROL OF EXECUTABLE JOBS OVER COMPUTE INSTANCES

BACKGROUND

Service provider systems have been developed to provide a variety of digital services available to client devices over a network. An example of this is implementation of "the cloud" in which hardware and software resources of the service provider system are made available over a network to various entities to perform desired computational tasks. To do so, a "compute instance" is made available that represents a collection of hardware and software resources of the service provider system used to implement an executable job.

Compute instances, for example, are configurable as a defined quantity of hardware and software resources of a computing platform, e.g., as a virtual server instance as part of a cloud computing platform. A variety of types of compute instances are often made available by the service provider system, each having corresponding functionality. In a first example, an uninterruptible compute instance (also referred to as on-demand instances) is made available that permits lifecycle control by a client device that accesses in the instance over a network, e.g., to launch, stop, reboot, terminate, and so on. Thus, in this example the client device directly manages and controls execution of the uninterruptible compute instances for implementation of executable jobs by the service provider system.

In contrast, a second type of compute instance is referred to as an interruptible compute instance. Interruptible compute instances are typically implemented by the service provider system to provide access to excess hardware and software capacity of the platform at a reduced cost. However, interruptible compute instances do not support lifecycle management and control by a client device, but rather are controlled at the service provider system. Consequently, interruptible compute instances involve a tradeoff of control and predictability for a reduced cost (i.e., price) with a probability of interruption.

In practice, client devices have limited insight into operation of interruptible compute instances by service provider systems. Because of this, executable jobs that are part of an overall computational task that consume significant amounts of time and resources are challenged with short notice and frequent interruptions that typically occur in real world scenarios. These interruptions, for instance, may reduce and even negate any cost savings experienced by a client device through use of interruptible compute instances when confronted with large computational tasks, such as training a model using machine learning, due to a lack of insight into when and how interruptions occur. As a result, efficiency of hardware and software resources of a service provider system in implementation of executable jobs to achieve a result specified by a client device through use of interruptible compute instances is reduced and in some real-world scenarios trails consumption of hardware and software resources associated with use of uninterruptible compute instances.

SUMMARY

A resource control system is described that is configured to control scheduling of executable jobs by compute instances of a service provider system. In one example, the resource control system outputs a deployment user interface. The deployment user interface supports receipt of user inputs to specify job information, e.g., executable jobs that are to be and/or are already implemented by respective compute instances of a service provider system. Upon receipt of the job information, the resource control system communicates with the service provider system to obtain logs from compute instances implemented by the service provider system for the respective executable jobs.

The resource control system then uses data obtained from the logs to estimate utility indicating status of respective executable jobs and an amount of time to complete the executable jobs by respective compute instances. From this, the resource control system employs a machine-learning module to generate an action to be performed by compute instances for respective executable jobs. To do so, the machine-learning module processes the log, the estimate of utility, and the amount of time per executable job as part of a reinforcement learning optimization problem. Once the actions are generated, the resource control system communicates the actions to control performance of the action by respective compute instances of the service provider system, e.g., via a network.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
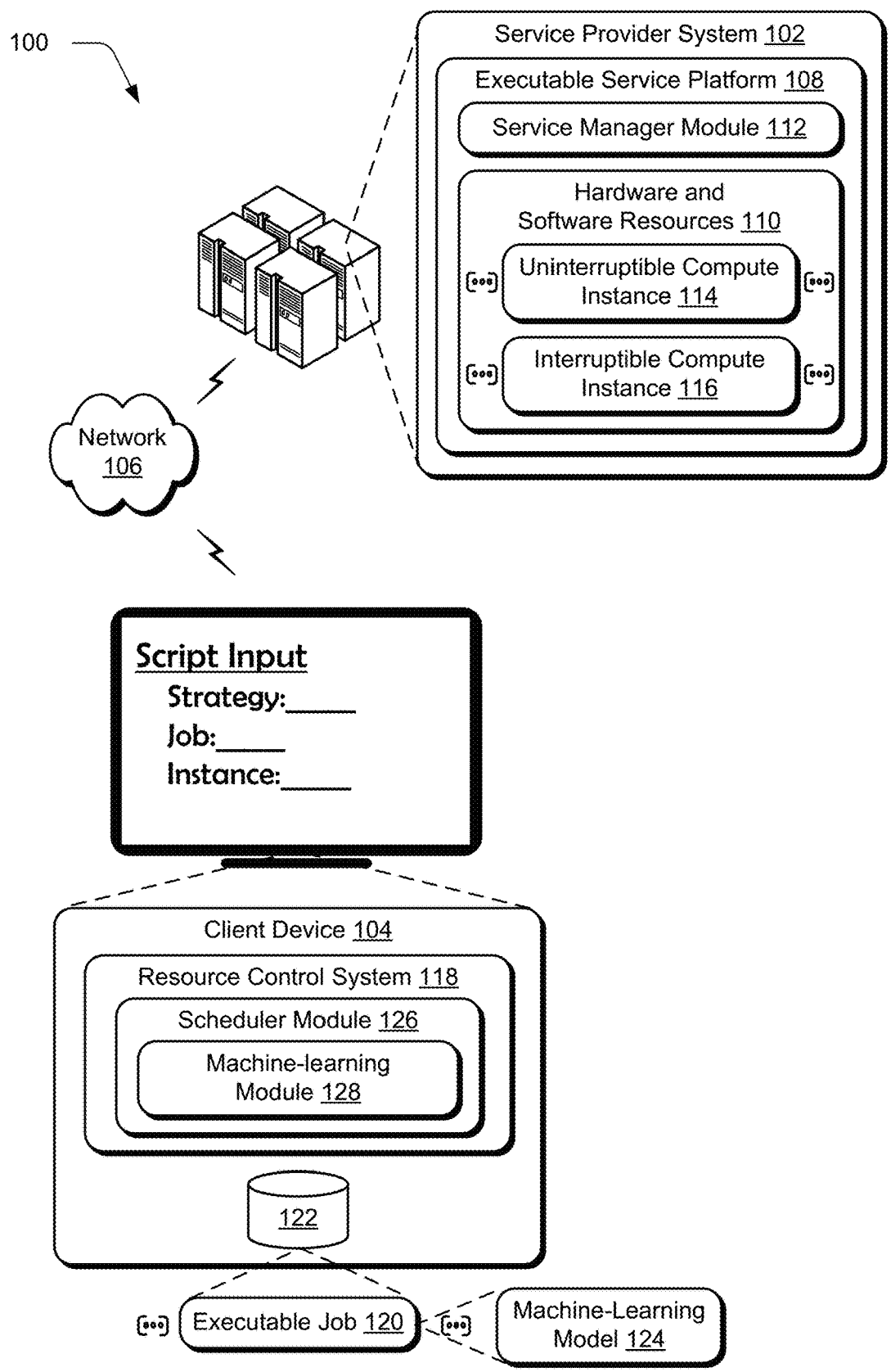
FIG. 1 is an illustration of an environment in an example implementation that is operable to employ compute instance scheduling and control techniques described herein.

Service provider systems are configured to support a variety of types of compute instances to implement digital services "in the cloud" using hardware and software resources of an executable service platform. In one example, compute instances are configured to support lifecycle control by a client device requesting access to these compute instances, which are referred to as uninterruptible compute instances. Surplus resources are rented with deep discounts as interruptible compute instances, but service provider systems (e.g., cloud providers) retain control of their lifecycle in order to user those surplus resources (e.g., an uninterruptable or "regular" compute instances) at a higher price as demanded. A notable example of this involves training a machine-learning model.

Interruptible compute instances are made available by the service provider system to provide access to excess capacity of hardware and software resources of an executable service platform implemented by the system. Because of this, however, lifecycle control is maintained at the service provider system and is not available to the client device. In practice, service provider systems provide limited insight into operation of the interruptible compute instances. As such, client devices are challenged with frequent interruptions and unknown frequencies of these interruptions, which varies across different instances implemented by the service provider system. This limited insight, frequent interruptions, and unknown frequency of these interruptions cause interruptible compute instances to fail in real world scenarios involving computational tasks that consume significant amounts of computational resources.

Accordingly, a resource control system is described that is configured to control scheduling of executable jobs (also referred to simply as "jobs" in the following discussion) by compute instances of a service provider system. The resource control system employs a machine-learning module to optimize scheduling across compute instances of a service provider system, e.g., through use of a convex optimization control policy. These techniques are also usable by the resource control system to schedule executable jobs using different types of compute instances (e.g., interruptible and/or uninterruptible) to optimize computational task completion, e.g., to minimize project cost, optimize resource utilization, and so forth. In a machine-learning model training example, scheduling of the executable jobs to respective compute instances by the resource control system is based a loss function configured to maximize total aggregate utility of the plurality of executable jobs used for this computational task, i.e., the train the model.

In one example, the resource control system outputs a deployment user interface. The deployment user interface supports receipt of user inputs to specify job information, e.g., executable jobs that are to be and/or are already implemented by respective compute instances of a service provider system. In an implementation, executable jobs are configured as a general object that stores its state data at a prespecified location. The state of a job includes a code base, saved checkpoints, logs, and a command to initiate or resume execution.

Upon receipt of the job information, the resource control system communicates with the service provider system to obtain logs from compute instances implemented by the service provider system for the respective executable jobs. The job information includes data specifying instance pools that include the compute instances used by the executable jobs and therefore the resource control system obtains logs from these instance pools. Instance pools are used to create and manage multiple compute instances together as a group. The logs, for instance, are configurable to describe progress (e.g., utility, epochs, time spent, money spent), status (e.g., terminated, running), and so on of the executable jobs as implemented by respective compute instances.

The resource control system then uses data obtained from the logs to estimate utility of respective executable jobs as implemented by respective compute instances, e.g., job progress that quantifies a state relative to completion of the executable jobs, respectively, at the compute instances. For jobs that are currently implemented by respective compute instances, data is obtained from the compute instances that describe progress of these jobs, e.g., a current status of the executable jobs that describes "how far" the execution of the jobs has progressed towards completion. For executable jobs that are to be initiated for implementation and consequently a current status is not applicable and therefore the estimation of utility is determined using base data that describes implementation of previous executable jobs by compute instances of the service provider system. The resource control system also estimates an amount of time an executable job likely consumes until completion, e.g., for a given instance type.

The resource control system then employs a machine-learning module to generate an action to be performed by compute instances for respective executable jobs, e.g., to request a compute instance, kill a compute instance, or "no-op" to proceed as is. To do so, the machine-learning module processes the log, the estimate of utility, and the amount of time per executable job as part of a reinforcement learning optimization problem. In a machine-learning model training example, for instance, the reinforcement learning optimization problem is tasked with maximizing total aggregate utility by identifying actions for respective executable jobs of a computational task, e.g., to train the model. In one example, the optimization function is implemented as a convex function that is solvable using a convex optimizer.

Once the actions are generated, the resource control system then communicates the actions to control performance of the action by respective compute instances of the service provider system, e.g., via a network. In an implementation in which an action involves assigning the executable job to a particular compute instance, the resource control system is configured to leverage instance probing to maximize efficiency in the implementation of the executable job by a respective compute instance. Probing is used to address challenges caused by a lack of insight by the service provider system into operation of the compute instances.

Instance pools are used to form collections of compute instances for implementation of collections of executable jobs. However, conventional service provider systems do not expose information on a currently available capacity of individual compute instances within the instance pool. To overcome this challenge, the resource control system is configured to probe the service provider system by transmitting a request that leverages functionality used to replenish compute instances from a given instance pool up to a given capacity using a given strategy. The service provider system, for instance, supports user specified strategies to manage the instance pool, e.g., to select a compute instance based on lowest price, optimize capacity, maintain diversity to maximize different types of compute instances employed, and so forth. The resource control system transmits a request to an instance pool (having a single capacity) using a capacity optimized strategy to cause the service provider system to select a compute instance from the instance pool that optimizes capacity, e.g., has a maximum capacity. Maximum capacity is definable in a variety of ways as further described in the following sections, an example of which based on a lowest interruption rate. Therefore, the compute instance indicated in a response received by the resource control system from the service provider system has a maximum capacity available at that moment from the instance pool and is assigned the executable job for implementation.

In this way, the resource control system overcomes technical challenges of conventional service provider systems in accessing compute instances and a lack of insight provided by these conventional systems to improve operational efficiency in implementation of executable jobs by respective compute instances. Further discussion of these and other examples is included in the following sections and shown in corresponding figures.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ compute instance control techniques described herein. The illustrated environment 100 includes a service provider system 102 and a client device 104 that are communicatively coupled, one to another, via a network 106. Computing devices that implement the service providers system 102 and the client device 104 are configurable in a variety of ways.

A computing device, for instance, is configurable as a desktop computer, a laptop computer, a mobile device (e.g., assuming a handheld configuration such as a tablet or mobile phone), and so forth. Thus, a computing device ranges from full resource devices with substantial memory and processor resources (e.g., personal computers, game consoles) to a low-resource device with limited memory and/or processing resources (e.g., mobile devices). Additionally, a computing device is also representative of a plurality of different devices, such as multiple servers utilized by a business to perform operations "over the cloud" as illustrated for the service provider system 102 and as described in FIG. 10.

The service provider system 102 includes an executable service platform 108 of hardware and software resources 110. The executable service platform 108, for instance, is configured to provide digital services "in the cloud" that are accessible by the client device 104 via the network 106 through execution by the hardware and software resources 110. Thus, the hardware and software resources 110 provide an underlying infrastructure to manage execution of jobs and storage of associated data, e.g., provided by the client device 104.

The executable service platform 108 supports numerous computational and technical advantages, including support of an ability of the service provider system 102 to readily scale resources to address wants of the client device 104. Thus, instead of incurring an expense of purchasing and maintaining proprietary computer equipment for performing certain computational tasks, cloud computing provides the client device 104 with access to a wide range of hardware and software resources 110 so long as the client has access to the network 106.

To portion the hardware and software resources 110, a service manager module 112 of the executable service platform 108 employs compute instances. A "compute instance" refers to a quantum (i.e., portion) of a virtual machine or processing environment provided remotely over a network 106, e.g., via on one or more servers or other computing devices including virtual processors. Execution of compute instances is dynamic, which permits any number of servers (e.g., virtually or physically) to be combined on demand to implement the hardware and software resources 110 and to avoid processing delays or interruptions. As such, compute instances are freely allocated and can span multiple machines to achieve maximum or increased utilization of the available computational resources. The compute instances also reduce downtime associated with servicing hardware and software resources 110, whether it be servers or network equipment. For example, a compute instance is moveable from one physical machine to another without a loss of availability and permits seamless transfers of data from one machine to another.

Examples of types of compute instances are illustrated as an uninterruptible compute instance 114 and an interruptible compute instance 116. As previously described, the uninterruptible compute instance 114 is configured such that a lifecycle of the instance is controllable by the client device 104. Lifecycle control includes when to launch, stop, reboot, hibernate, start, terminate, and so forth. Examples of uninterruptible compute instances 114 include reserved virtual machine instances and on-demand instances available from Microsoft Azure®, Amazon Web Services® (AWS), and so on.

Interruptible compute instances 116, on the other hand, are configured to provide access to excess capacity of the hardware and software resources 110 of the service provider system 102. This accessibility is provided at a reduced cost as opposed to uninterruptible compute instance 114. However, control of the lifecycle of the interruptible compute instance 116 is maintained at the service provider system 102. Examples of interruptible compute instances 116 include volatile instances and spot instances available from Microsoft Azure®, Amazon Web Services® (AWS), and so on.

The client device 104 includes a resource control system 118 configured to control interaction with compute instances of the service provider system 102 remotely via the network 106. The resource control system 118, for instance, is configured to control implementation of executable jobs 120 (e.g., illustrated as maintained in a storage device 122) by compute instances of the executable service platform 108. The executable jobs 120 are configurable alone or implementation together as part of a group by compute instances (e.g., instance pool) to achieve a computational task, such as to train a machine-learning model 124. Therefore, selection of different types of compute instances by the resource control system 118 for implementation of respective executable jobs 120 is usable to achieve a variety of different outcomes, such as to minimize cost, minimize an amount of time to achieve completion of an overall computational task, and so forth Accordingly, the resource control system 118 includes a scheduler module 126 having a machine-learning module 128 to schedule and manage implementation of executable jobs 120 by respective compute instances, e.g., uninterruptible compute instances 114 and/or interruptible compute instances 116. In the illustrated example, training of a machine-learning model 124 using executable jobs 120 employs an extensive amount of hardware and software resources 110 and as such is expensive to perform using uninterruptible compute instance 114, solely. Therefore, interruptible compute instances 116 provide a way in which to reduce this computational cost by leveraging interruptible compute instances 116.

However, the reduced cost of interruptible compute instances 116 comes with a tradeoff involving frequent interruptions, short notice before an interruption, and so on that challenge resource intensive tasks such as training a machine-learning model 124. The service provider system 102, for instance, may terminate an interruptible compute instance from one client device in favor of implementing an uninterruptible compute instance from another client device. Accordingly, the scheduler module 126 and machine-learning module 128 are configured to address these challenges caused by interruptions of the interruptible compute instances 116 caused by lifecycle management by the service provider system 102.

The machine-learning module 128, for instance, is configured to implement reinforcement learning to optimize placement of the executable jobs 120 on respective compute instances of the executable service platform 108. To do so, the scheduler module 126 employs a variety of information to generate actions to be performed by respective compute instances in implementing the executable jobs 120. Examples of this information include predicting how much of a reduction in training loss is achievable if the training is prolonged further, an amount to time to complete an executable job 120 based on different instance sizes and architectures, a probability of termination of the interruptible compute instances 116 by the executable service platform 108, and so on. The machine-learning module 128 receives the information as an input as part of a reinforcement learning optimization problem. Based on this information, the machine-learning module 128 attempts to maximize a total aggregate utility of the executable jobs 120 by generating a set of actions that are implemented on different types of compute instances.

Figure 2:
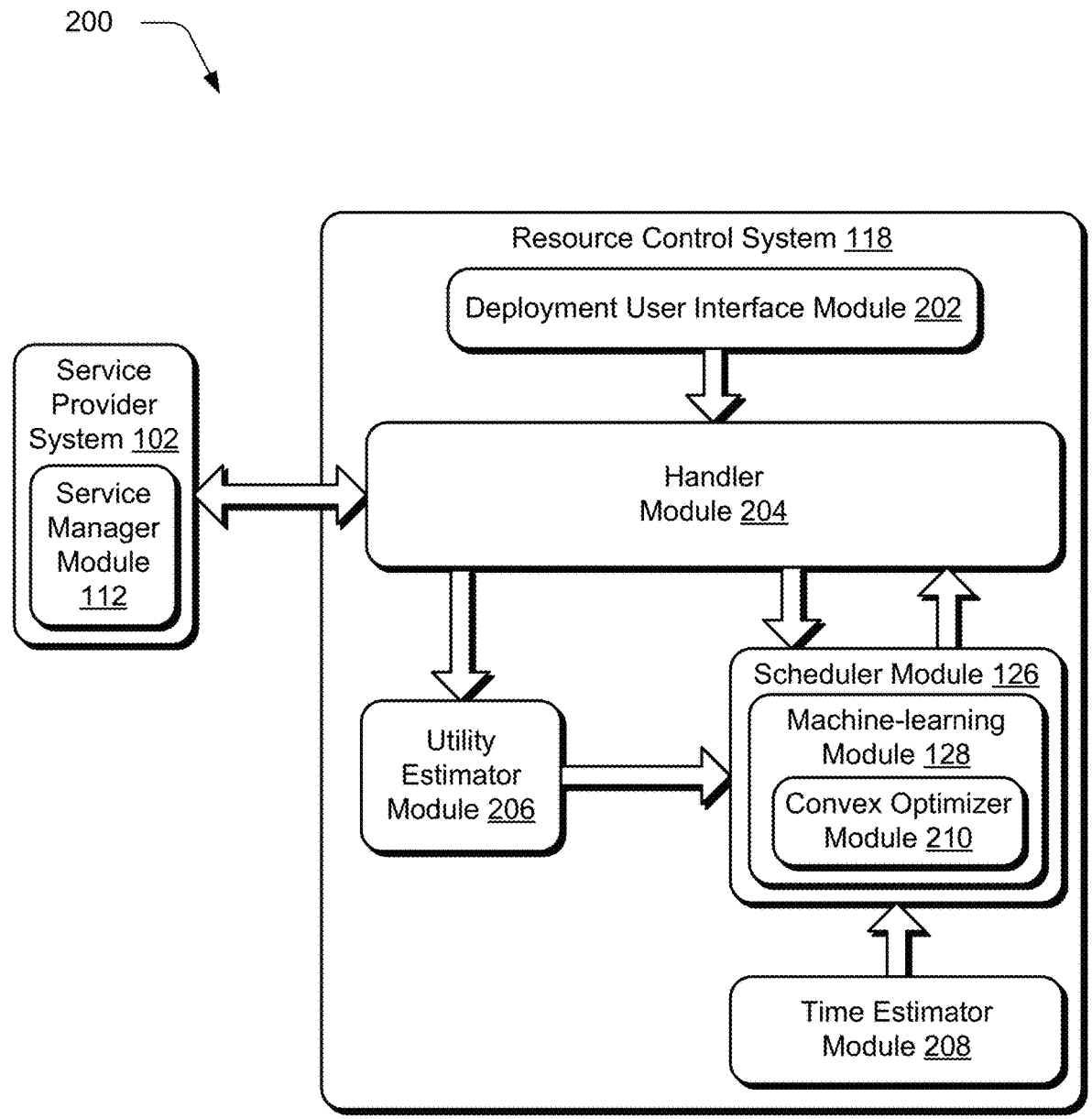
FIG. 2 depicts an example system showing operation of a resource control system of FIG. 1 in greater detail.
Figure 3:
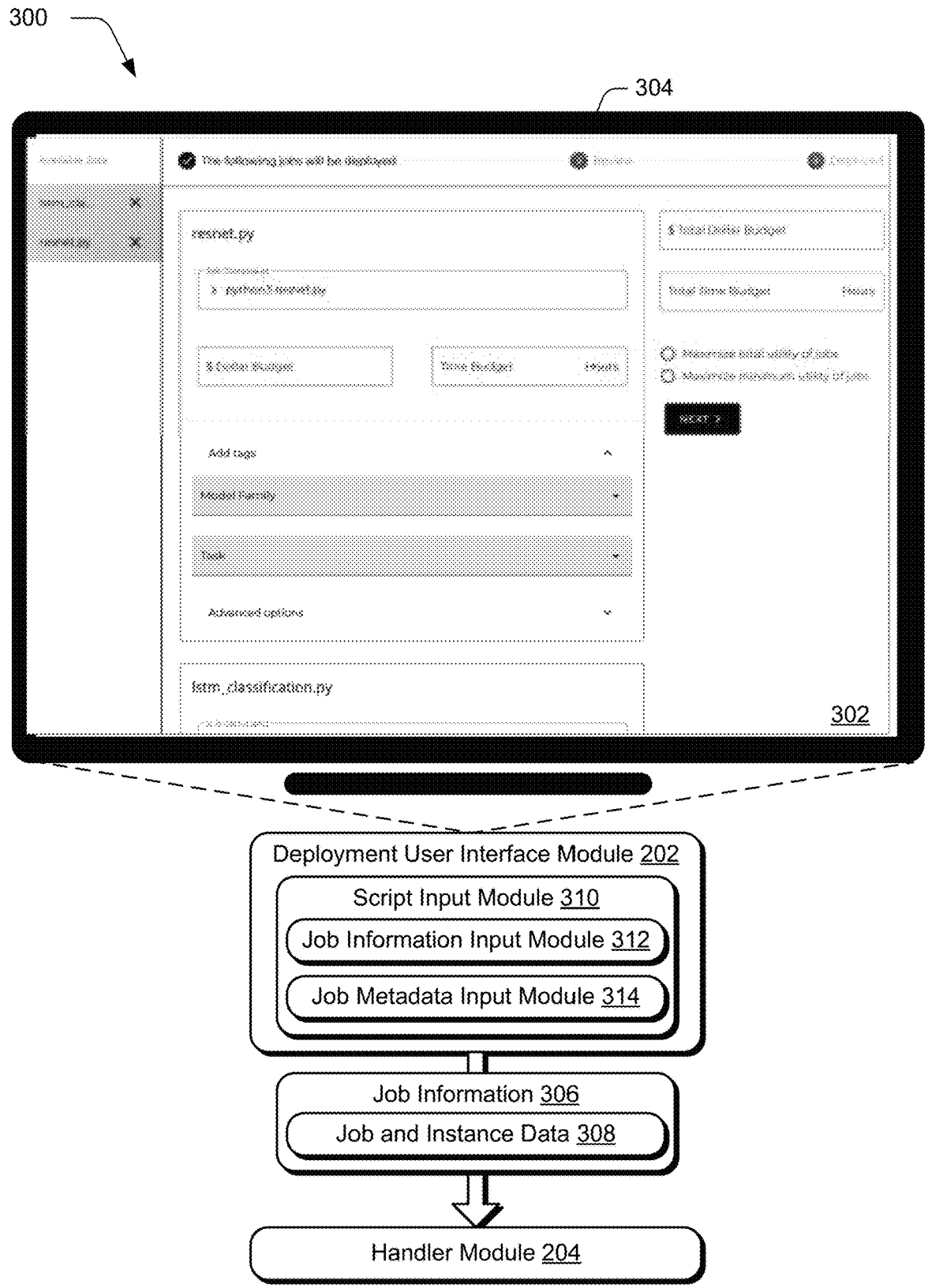
FIG. 3 depicts an example system showing operation of a deployment user interface module of the resource control system of FIG. 2 in greater detail.

FIG. 2 is an illustration depicting an example architecture 200 of the resource control system 118 of FIG. 1 in greater detail. The resource control system 118 includes a deployment user interface module 202, a handler module 204, a utility estimator module 206, a time estimator module 208, and the scheduler module 126 from FIG. 1.

The deployment user interface module 202 is configured to output a user interface to receive user inputs specifying job information and job metadata. The user interface, for instance, includes representations of available executable jobs 120 that are selectable for deployment on the service provider system 102 and/or are already deployed to compute instances of the service provider system 102. The user interface is also configurable to input job metadata, such as to specify per-job limits, global limits on runtime and/or expended funds, a dataset of the executable jobs 120, network architectures, and so forth. In an implementation, the job information is dynamically changeable during runtime through interaction with the user interface, e.g., during implementation of the executable jobs 120 by the compute instances of the executable service platform 108.

The handler module 204 is configured to interface internally between different modules within the resource control system 118 as well as externally over the network 106 with a service manager module 112 of the service provider system 102. In each iteration, the handler module 204 accepts the job information from the deployment user interface module 202. The handler module 204 then interfaces with the service provider system 102 to obtain logs describing implementation of executable jobs 120 by respective compute instances of the executable service platform 108.

The logs are configurable to describe a variety of characteristics involving implementation of the executable jobs 120 by respective compute instances. Logs, for instance, are configurable to describe progress (e.g., utility, epochs, time spent, money spent), status (e.g., terminated, running), and so forth of current implementation of the executable jobs 120 by the compute instances. The logs are then passed to a utility estimator module 206 to estimate utility of the executable jobs 120 as implemented by the compute instances. Information from the logs describing an amount of funding left, time left, and other information is also passed to the scheduler module 126 to aid in generating the action as further described below.

The utility estimator module 206 is representative of functionality to estimate utility of respective executable jobs 120 as implemented by respective compute instances, e.g., future utility as a function of epoch number. At a beginning of a computational task, e.g., to train the machine-learning model 124, utility estimates are based, at least in part, on a prior utility curve of similar executable jobs 120. As implementation of the executable jobs 120 continues over time, contribution of the prior on estimating the utility is decreased. The estimate of utility, in this example, for each of the executable jobs 120 is passed as a utility curve to the scheduler module 126.

The time estimator module 208 is representative of functionality of estimate an amount of time to complete executable jobs 120, e.g., for a particular types of compute instances. This estimate is used to estimate utility as a function of time and cost, which supports use of time and cost constraints as part of scheduling and as such is also supplied to the scheduler module 126.

The scheduler module 126 accepts as inputs the estimate of utility, the amount of time, and the logs. From this, the scheduler module 126 employs the machine-learning module 128 to generate actions to be performed by respective compute instances in the implementation of respective executable jobs 120. In one example, this problem is tasked with maximizing total aggregate utility of the executable jobs 120 involved in the computation task (e.g., to train the machine-learning model 124) by selecting particular actions for use by respective compute instances and instance types.

The machine-learning module 128 is configured to maximize utility in a variety of ways. In the illustrated example, the machine-learning module 128 includes a convex optimizer module 210 that employs a convex optimizer to optimize this utility. A convex optimization problem is an optimization problem in which an objective function is a convex function, and a feasible set is a convex set. Convex optimization involves minimizing convex functions over convex sets, a basis of which is used to generate actions for executable jobs 120 and respective compute instances, further discussion of which is included in the following section.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Compute Instance Control Workflow

The following discussion describes scheduling and control techniques for executable jobs and compute instances that are implementable utilizing the previously described systems and devices. Aspects of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-9 as describing a procedure 900 of FIG. 9.

To begin in this example workflow, job information is received via a user interface (block 902). As shown in an example implementation 300 of FIG. 3, a deployment user interface module 202 is depicted as outputting a user interface 302 by a display device 304. The user interface 302 is configured to accept user inputs to specify job information 306, such as job and instance data 308. The job information 306, for instance, is configurable as part of a job script input through interaction with a script input module 310 to enter job information through interaction with a job information input module 312 and job metadata through interaction with a job metadata input module 314. Examples of job metadata include per-job limits and global limits on runtime and expended fees, datasets, network architectures, and so forth.

The user interface 302, for instance, is configurable to output representations of executable jobs 120, e.g., as part of computational tasks. Representations of the executable jobs 120 are generated by the job information input module 312 and displayable via the user interface 302. The representations include executable jobs 120 that are selectable for deployment on the service provider system 102 and/or are already deployed to compute instances of the service provider system 102. In this way, the user interface 302 supports selection of executable jobs 120 to be deployed and/or executable jobs 120 that are already deployed to the service provider system 102.

The executable jobs 120 of FIG. 1, for instance, involve training of a machine-learning model 124. Therefore, the user interface 302 is configurable to include representations of particular types of models and executable jobs 120 referencing training data usable to train a selected model. Based on the identification of the executable jobs 120, the job information 306 is generated to include job and instance data 308 which is also configurable to identify compute instances of the service provider system 102 corresponding to the identified jobs. The job information 306 is then passed from the deployment user interface module 202 as an input to the handler module 204.

Figure 4:
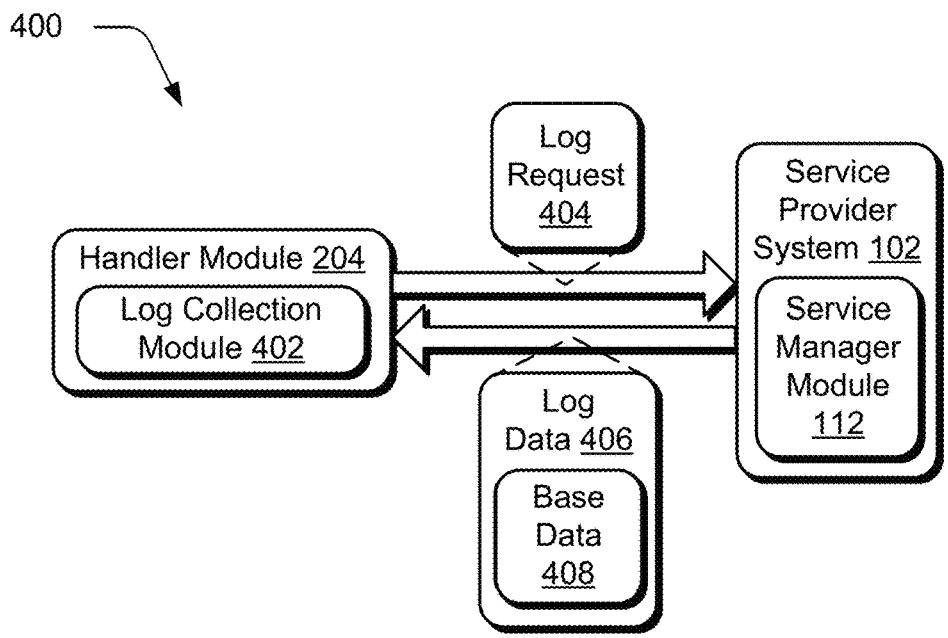
FIG. 4 depicts an example system showing operation of a handler module of the resource control system of FIG. 2 in greater detail as obtaining log data.

Upon receipt of the job information 306 as depicted in an example system 400 of FIG. 4, the handler module 204 utilizes a log collection module 402 to obtain log data describing status of compute instances of the service provider system 102 in implementation of executable jobs 120 (block 904) described by the job information 306. The log collection module 402, for instance, generates a log request 404 that identifies executable jobs 120 and/or compute instances identified in the job and instance data 308. The log request 404 is communicated to the service provider system 102 via the network 106.

The service manager module 112 is then employed to collect log data 406 from respective compute instances that are currently implementing executable jobs 120. The log data 406 may also include base data 408 that is used as a basis to select compute instances for implementation of new executable jobs. In an implementation, the log collection module 402 obtains the log data 406 before a request for this data is received from the scheduler module 126 to improve overall efficiency. In an implementation, a separate process is spawned for each executable job 120 and executed in parallel by the log collection module 402 to pull corresponding log data 406 from respective compute instances. A "main" process implementing the log collection module 402 "sleeps" after spawning these separate processes to preserve computational resources of the client device 104.

Figure 5:
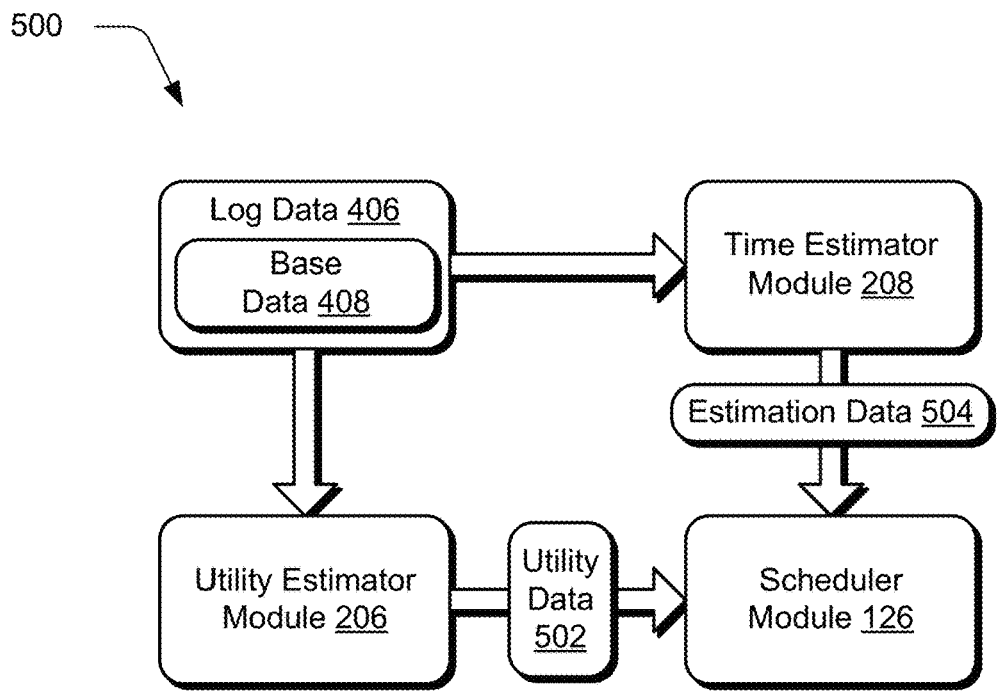
FIG. 5 depicts an example system showing operation of a utility estimator module and a time estimator module of the resource control system of FIG. 2 in greater detail.

FIG. 5 depicts an example system 500 in which a utility estimator module 206 of FIG. 2 is configured to compute job utility (block 906) represented as utility data 502 based on the log data 406 of FIG. 4. The utility estimator module 206 is configured to compute job utility by fitting parameters as utility curves to log data 406 for compute instances that are currently implementing executable jobs 120 and uses base data 408 for executable jobs that are to be initiated for implementation by respective compute instances. The utility data 502, once computed, is communicated from the utility estimator module 206 to the scheduler module 126 per executable job and maintained in a shared directory for access by the scheduler module 126.

Job utility is computed per executable job 120 as a prediction of future utility for that job. Job utility is configurable as a user-defined metric input via the user interface output by the deployment user interface module 202. Utility is definable in a variety of ways, examples of which include best accuracy, f1-score, dice score, word error rate, and so forth. Metrics are combinable, and in such an instance are normalized (e.g., between 0 and 1) to make these metrics comparable between different types of jobs.

In an implementation, the utility data 502 is configured as a utility curve that plots utility over time, e.g., epochs. The utility curve includes the following properties: (1) it is increasing in nature, (2) it saturates after a significant number of epochs, and (3) has an overall concave structure, although at particular points in time the utility curve can assume a convex structure.

A function that satisfies each of these properties is "$a-be^{-cx}$," where "x" is a number of epochs. In order to encourage generalization and avoid premature or late saturation, this function is fit to recent data using a sliding window. The window size is definable based on a maximum number of epochs specified through interaction with the user interface of the deployment user interface module 202. The window size, for instance, is definable as a fraction between ⅕ to ¼ of a maximum number of epochs. Accordingly, data fit by the utility estimator module 206 on at any point is from "max(0, current_epoch−window)" to "current_epoch."

Further, the utility estimator module 206 ensures the following while fitting the utility curves. First, final parameters from a previous fitting of a utility curve are passed as initial parameters to the utility estimator module 206 again, which then also fits the function on newly available data. Second, the search space used by the utility estimator module 206 to fit the function is confined within a specified bound of those initial parameters. This is done to pass information about a previous fitting of a curve to the next fitting and also functions to regularize parameters by enforcing a bound and prevents overfitting.

Parameters for executable jobs 120 that are to be initiated (i.e., started) for implementation by respective compute instances (i.e., when a number epochs the executable job has run is zero) are determined using the base data 408. The base data 408 is configurable to describe implementation of executable jobs 120 that have completed by respective compute instances of the service provider system 102. In this way, the base data 408 provides insights usable by the scheduler module 126 to schedule implementation of executable jobs 120 by respective compute instances and thus provides increased richness and insight over other techniques, e.g., set or default values.

The utility estimator module 206, for instance, first locates an executable job described in the base data 408 that approximates an executable job to be initiated. Base data 408 is configurable to describe a variety of characteristics of the executable jobs 120. Examples of base data 408 include a set of fields for each job type, model type, task type, dataset, optimizer, batch size, utility estimator module 206 parameters, and so on. Therefore, information provided via the deployment user interface module 202 that describes the computational task (e.g., training the machine-learning model 124) is used to locate similar executable jobs 120 based on similarity of these characteristics, one to another.

A user input, for instance, is received via the user interface 302 of the deployment user interface module 202 specifying a machine-learning model type and optimization to be used. The utility estimator module 206 then extracts information from the base data 408 having the same type of model and/or optimization employed, parameters of the executable jobs 120 are obtained, and utility curves are fit for a specified maximum number of epochs. The utility curves are averaged to compute the utility estimate described by the utility data 502. In an instance in which the user input is not provided, an average of each of the utility curves in base data 408 is taken as an initial estimate. In this implementation, averaging is performed on the utility curves (and not the parameters) because "a–be$^{-cx}$" is a non-linear function and does not have the same form on a linear transformation.

The log data 406 is also used by the utility estimator module 206 to generate estimation data 504 as an estimate of an amount of time for completion of the executable jobs 120 (block 908). The time estimator module 208 is configurable to estimate an amount of time that is likely to be consumed by a particular executable job 120 for completion by a particular type of compute instance. This estimate is used to estimate utility as a function of time and cost, which supports use of time and cost constraints as part of scheduling and as such is also supplied as an input to the scheduler module 126.

Figure 6:
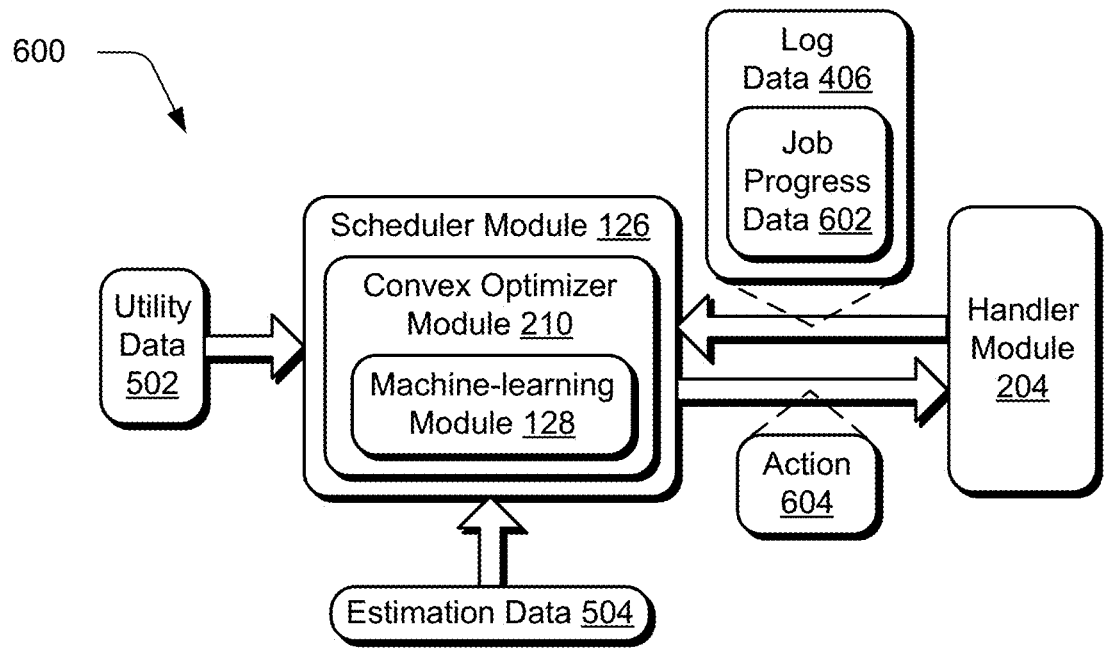
FIG. 6 depicts an example system showing operation of a scheduler module of the resource control system of FIG. 2 in greater detail as generating an action based on the log data of FIG. 4 and utility and estimate data of FIG. 5.

FIG. 6 is an illustration of an example system 600 showing operation of the scheduler module 126 in greater detail. The scheduler module 126 is configured to schedule implementation of the executable jobs 120 on respective compute instances, e.g., uninterruptible compute instances 114 and/or interruptible compute instances 116. The scheduler module 126 is configurable in a variety of ways, including a preemptive version and a non-preemptive version.

The scheduler module 126 is depicted as receiving job progress data 602 included in log data 406 from the handler module 204, utility data 502 from the utility estimator module 206, and estimation data 504 from the time estimator module 208. From this, the scheduler module 126 generates actions 604, using a machine-learning module 128, to be performed by the compute instances in implementation of respective executable jobs 120 (block 910).

The scheduler module 126, for instance, fetches the received job progress data 602 from a folder shared with the handler module 204. The job progress data 602 describes a variety of characteristics in the implementation of the executable jobs 120 by the compute instances. Examples of these characteristics include:

"$\hat{a}_{j,t}, \hat{b}_{j,t}, \hat{c}_{j,t}$": the predicted parameters of utility function of job "j" at time "t" provided by utility estimator module 206;

"$\hat{E}_{j,t}$": last logged epoch of job "j" at time "t";

"$\hat{p}_{i,t}$": price of instance "i" at time "t", e.g., for interruptible compute instances 116;

"$\widehat{fS}_{j,t}$": status of job "j" up until time "t";

"$\hat{I}_{j,t}$": instance on which job "j" is scheduled at time "t";

"$\widehat{BS}_{j,t}$": budget spent by job "j" up till time "t"; and

"$\widehat{TS}_{j,t}$": time spent by job "j" up till time "t" both in interrupted and running state.

This information at time instance "t" is referred as exogenous information "$W_t$."

The status of job "j" up until time "t" (i.e., "$\widehat{fS}_{j,t}$") is configurable to include the following values:
terminated: if job "j" finishes training;
running: if job "j" is running on an instance; n] and
interrupted: if job "j" is interrupted by natural interruption of spot instance or manual interruption by preemptive scheduling.

If the status of job "j" up until time "t" (i.e., "$\widehat{fS}_{j,t}$") is set as "terminated" then job "j" is no longer scheduled.

The instance "i" on which job "j" is scheduled at time "t" (i.e., "$\hat{I}_{j,t}$") includes the following values depending on a value of status of job "j" up until time "t" (i.e., "$\widehat{fS}_{j,t}$"):

If "$\widehat{fS}_{j,t}$=running," then "$\hat{I}_{j,t}$=instance identifier";
else "$\hat{I}_{j,t}$=none."

The following actions are generated by the scheduler module 126 where "$x_{j,t}$" is the action generated by the scheduler module 126 for job "j" at time "t," examples of which include the following values:

"$x_{j,t}$=no–op" if job "j" is to be continued in its present state; and

"$x_{j,t}$=instance pool" if job "j" is to be scheduled on any one of the compute instances in the instance pool.

In a preemptive scheduling scenario, the following action is also added:

"$x_{j,t}$=kill" if job "j" is to be interrupted.

In an implementation, the following constraints are maintained by the scheduler module 126 at each time instance "t":

$$\sum_j \widehat{BS}_{j,t} \leq \text{Total Budget}$$

where "TotalBudget" is the total budget allocated to each of the executable jobs 120 via user input received via the deployment user interface module 202, $$\sum_j \widehat{TS}_{j,t} \leq \text{Total Time}$$

where "TotalTime" is a total sum of time allocated to each of the executable jobs 120 by the user input received via the deployment user interface module 202, $$\widehat{BS}_{j,t} \leq \text{IndividualBudget}_j$$

where "IndividualBudget$_j$" is an individual budget allocated to job "j" by the user input received via the deployment user interface module 202, $$\widehat{TS}_{j,t} \leq \text{IndividualTime}_j$$

where "IndividualTime$_j$" is the individual time allocated to job "j" by the user input received via the deployment user interface module 202.

The machine-learning module 128 of the scheduler module 126 implements an optimization function that supports two types of terminal reward:

$$\text{Terminal Reward} = F(X^\pi, \omega) = \sum_j U_j^*(\text{Terminal } Epoch_j)$$

OR $$\text{Terminal Reward} = F(X^\pi, \omega) = \max \min_j U_j^*(\text{Terminal } Epoch_j)$$

where
"$U_j^*(E)$" denotes actual value of utility of job "j" at epoch "E";
"TerminalEpoch$_j$" denotes the final epoch of job "j" when the scheduler module 126 is to cease scheduling;
"$X^\pi$" is the action-policy dictated by behavior π that was followed by scheduler; and
"ω" denotes a history of exogenous information obtained by the scheduler module 126, "ω=(W$_1$, W$_2$, . . . )"

The optimization function of the scheduler module 126 is configured to maximize expected terminal reward as follows:

$$\text{Cost Function} = \max_\pi E_\omega[F(X^\pi, \omega)]$$

In an implementation, a deterministic policy is leveraged by the scheduler module 126 which is tasked with greedily attempting to maximize predicted terminal reward as an approximation to optimal policy. At each time step "t," the terminal reward is predicted by the scheduler module 126 and the action 604 is selected which maximizes the predicted terminal reward.

In order to predict the terminal reward, the scheduler module 126 leverages the utility data 502 for each job "j from the utility estimator module 206 and the estimation data 504 from the time estimator module 208 for each job "j" on instance "i" and a price prediction for each instance "i." "$U_{j,t}(E)$" denotes a utility estimate for job "j" at epoch "E" with parameters estimated at time "t." "T P E (j,i)" denotes estimator function used by the time estimator module 208 for job "j" and instance "i." For the price prediction at each time instance "t," it is assumed in this example that a future price for respective types of compute instances remains the same as it is at time "t" for each instance "i." Other examples are also contemplated in which the amount varies.

The scheduler module 126 includes a convex optimizer module 210 that models a technique of generating the action 604 as a convex optimization problem. In order to formulate the convex optimization problem, "$n_{j,i,t}$" are the set of variables to be determined, which denotes a number of epochs executable job "j" is to be scheduled on compute instance "i" after time "t." In a non-preemptive scheduling scenario, if a job "j, $\widehat{fS}_{j,t}$=Running" then "$n_{j,i,t}$" for job "j" is biased towards the following values:

- $n_{j, i \neq \hat{i}_{j,t}, t} = 0$
- $n_{j, \hat{i}_{j,t}, t} = n_j^{max}$ where "$n_j^{max}$" is the maximum number of epochs for which job "j" can be scheduled.

Constraints include:

$$\sum_j \sum_i \hat{p}_{i,t} * TPE(j, i) * n_{j,i,t} \leq \text{Total Budget} - \sum_j \widehat{BS}_{j,t}$$

$$\sum_i \hat{p}_{i,t} * TPE(j, i) * n_{j,i,t} \leq \text{Individual Budget}_j - \widehat{BS}_{j,t}$$

$$\sum_j \sum_i TPE(j, i) * n_{j,i,t} \leq \text{Total Time} - \sum_j \widehat{TS}_{j,t}$$

$$\sum_i TPE(j, i) * n_{j,i,t} \leq \text{Individual Time}_j - \widehat{TS}_{j,t}$$

Choices of objective function to be optimized include:

$$\max_{n_{j,i,t}} \sum_j U_{j,t}\left(\left(\sum_i n_{j,i,t}\right) + \hat{E}_{j,t}\right)$$

or $$\max_{n_{j,i,t}} \min_j U_{j,t}\left(\left(\sum_i n_{j,i,t}\right) + \hat{E}_{j,t}\right)$$

The first objective function is readily solvable because the predicted utility function used is non-decreasing and concave in nature. The second objective function can be converted to an equivalent form which is readily solved, an equivalent for of which is:

$$\max_{n_{j,i,t}} u$$

with additional constraint for all jobs "j" of:

$$U_j\left(\left(\sum_i n_{j,i,t}\right) + \hat{E}_{j,t}\right) \geq u$$

Once the variables for "$n_{j,i,t}$" are determined, an action for job "j" is generated.

When employing a non-preemptive scheduling technique, actions are generated for those jobs "j" having "$\widehat{fS}_{j,t}$=Interrupted." In order to generate these actions, the following is performed by the schedule module 126:

If max$_i$ $n_{j,i,t}$=0 and $\widehat{fS}_{j,t}$=Running $$x_{j,t} = \text{kill}$$

If max$_i$ $n_{j,i,t}$=0 and $\widehat{fS}_{j,t}$=Interrupted $$x_{j,t} = \text{no-op}$$

If $\max_i n_{j,i,t} > 0$ $x_{j,t} = \arg\max_i n_{j,i,t}$

Figure 7:
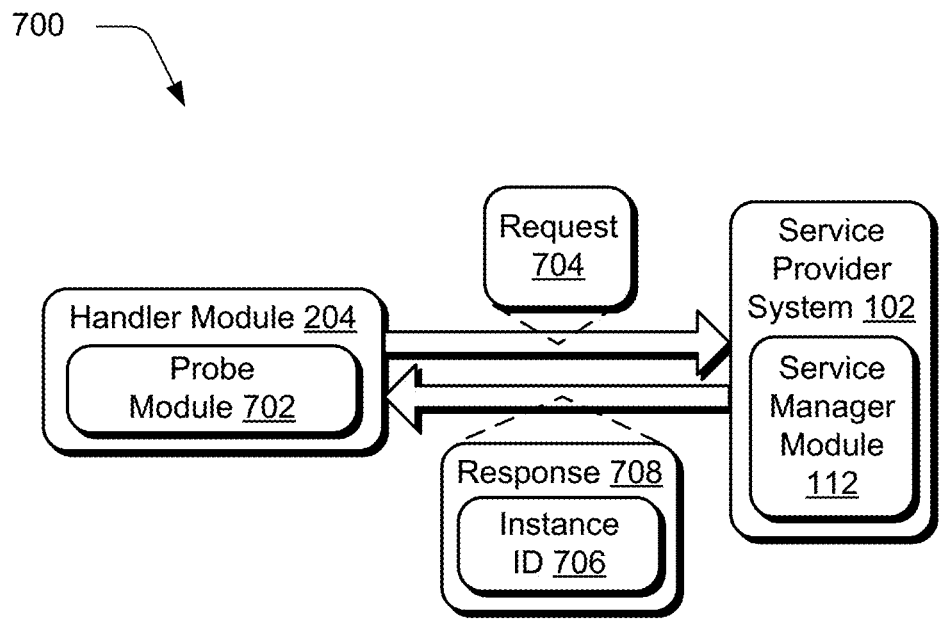
FIG. 7 depicts an example system showing operation of a handler module of the resource control system of FIG. 2 in greater detail as employing a probing technique.

FIG. 7 depicts an example 700 showing operation of the handler module 204 as involving probing to select a compute instance for implementation of the action 604 of a respective executable job. Instance pools are used to form collections of compute instances of a service provider system 102. However, conventional service provider systems do not expose information on a currently available capacity of individual compute instances within the instance pool.

To overcome this challenge, the handler module 204 employs a probe module 702 to probe the service provider system 102 (block 912) by transmitting a request 704 that leverages functionality used to replenish compute instances from a given instance pool up to a given capacity using a given strategy. The service manager module 112, for instance, supports user specified strategies to manage the instance pool using a respective criterion, e.g., to select a compute instance based on lowest price, optimize capacity, maintain diversity to maximize different types of compute instances employed, and so forth.

In order to leverage this functionality, the probe module 702 transmits a request 704 to the service provider system 102. The service manager module 112 then uses a capacity optimized strategy to select a compute instance from an instance pool that optimizes capacity, e.g., has a maximum capacity. Maximum capacity is definable in a variety of ways, an example of which based on a lowest interruption rate. Therefore, an instance ID 706 indicated in a response 708 received by the handler module 204 from the service provider system 102 (block 914) has a maximum capacity available at that moment from the instance pool and is assigned the executable job for implementation.

Figure 8:
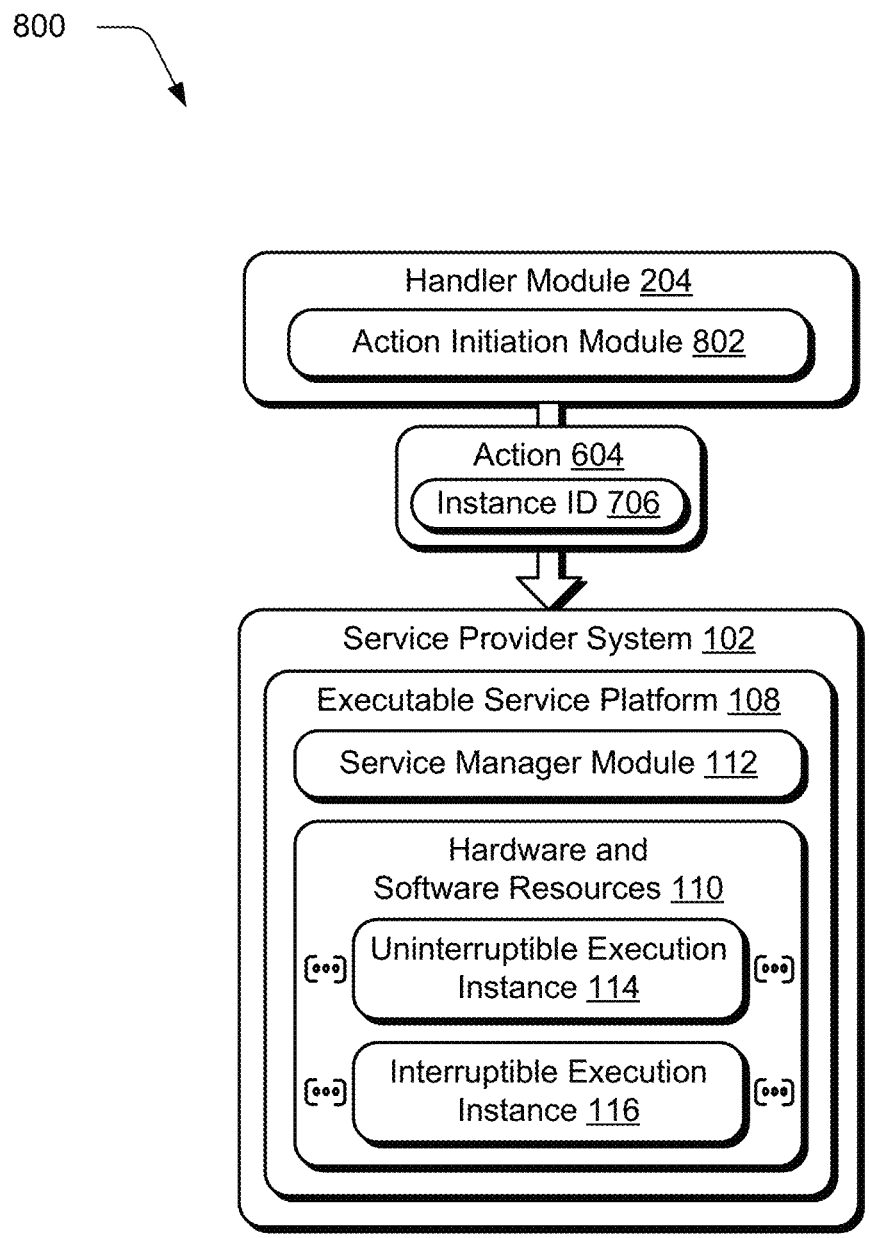
FIG. 8 depicts an example system showing operation of a handler module of the resource control system of FIG. 2 in greater detail as controlling performance of an action by a service provider system, the action generated in FIG. 6.
Figure 9:
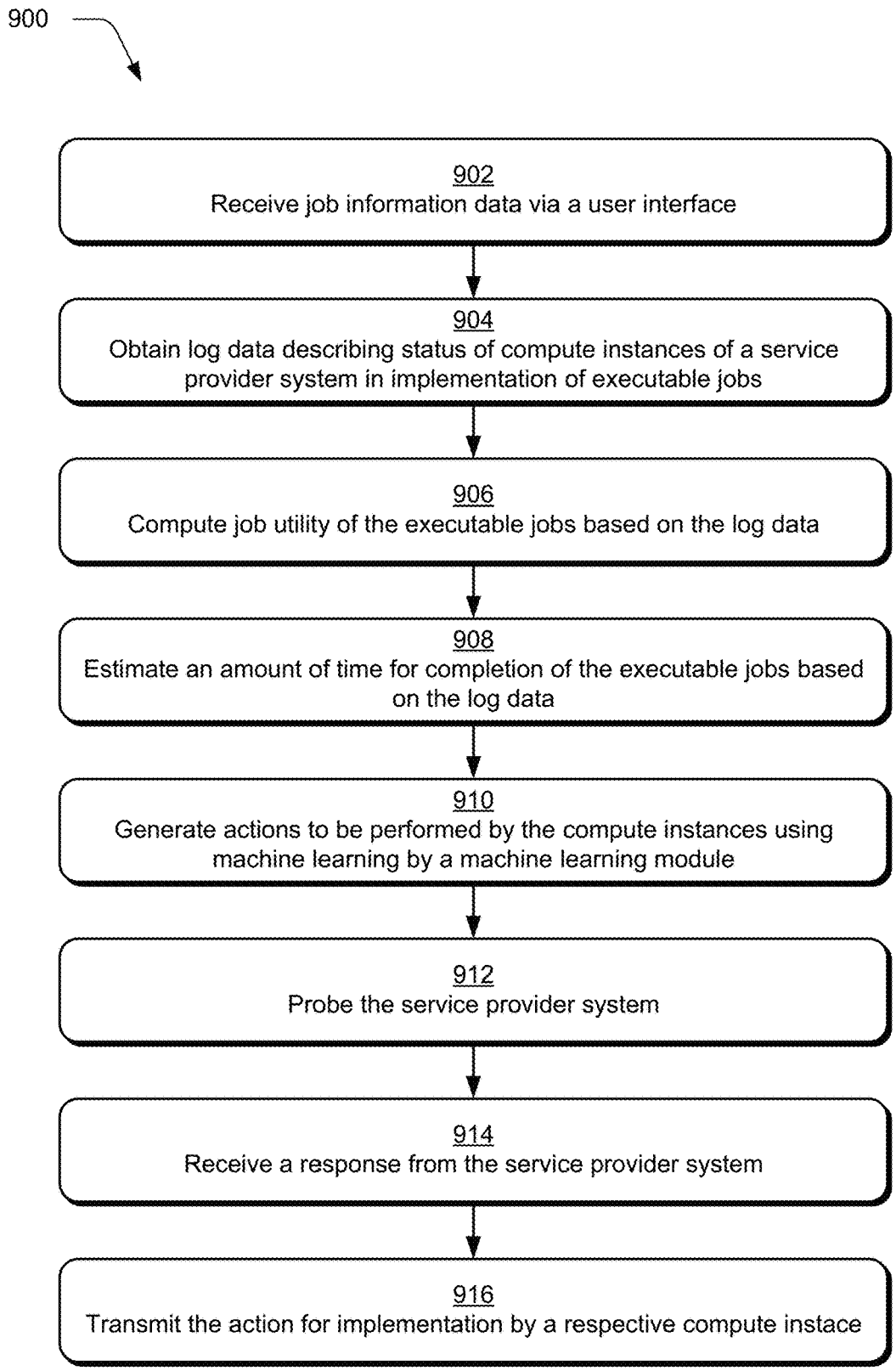
FIG. 9 is a flow diagram depicting a procedure in an example implementation of scheduling and control of compute instances.

FIG. 8 illustrates an example 800 in which an action 604 generated by the scheduler module 126 of FIG. 6 is transmitted to cause a compute instance identified in FIG. 7 to implement an executable job 120 (block 916). The handler module 204, for instance, includes an action initiation module 802 that is configured to form and transmit a communication via the network 106 for receipt by the service provider system 102. The communication is configured cause respective compute instances to perform a variety of actions.

In an instance in which an executable job 120 is to be scheduled to a "new" compute instance "for the first time," the action 604 is configured as a request. For a request, two internal mappings are maintained by the handler module 204 per job. The first mapping is a job to volume mapping so that when the next time another instance is scheduled for an executable job, this mapping is used to describe which volume contains the previous logs. The second mapping is an executable job to computing instance map which describes which compute instance of the service provider system 102 is assigned to implement a respective executable job. The first mapping is populated after requesting the volume.

An action that involving terminating a job involves obtaining an instance type from the mapping above and initiating a corresponding termination operation. This is performed by first terminating a request and if there is a compute instance corresponding to that request, then the compute instance is also terminated. The corresponding job instance map is then updated. In a "no-op" scenario, an action is not communicated. A variety of other examples are also contemplated.

In this way, a resource control system is configured to control scheduling of executable jobs by compute instances of a service provider system. The resource control system employs a machine-learning module to optimize scheduling across compute instances of a service provider system, e.g., through use of a convex optimization control policy. These techniques are also usable by the resource control system to schedule executable jobs using different types of compute instances (e.g., interruptible and/or uninterruptible) to optimize computational task completion, e.g., to minimize project cost, optimize resource utilization, and so forth.

Example System and Device

Figure 10:
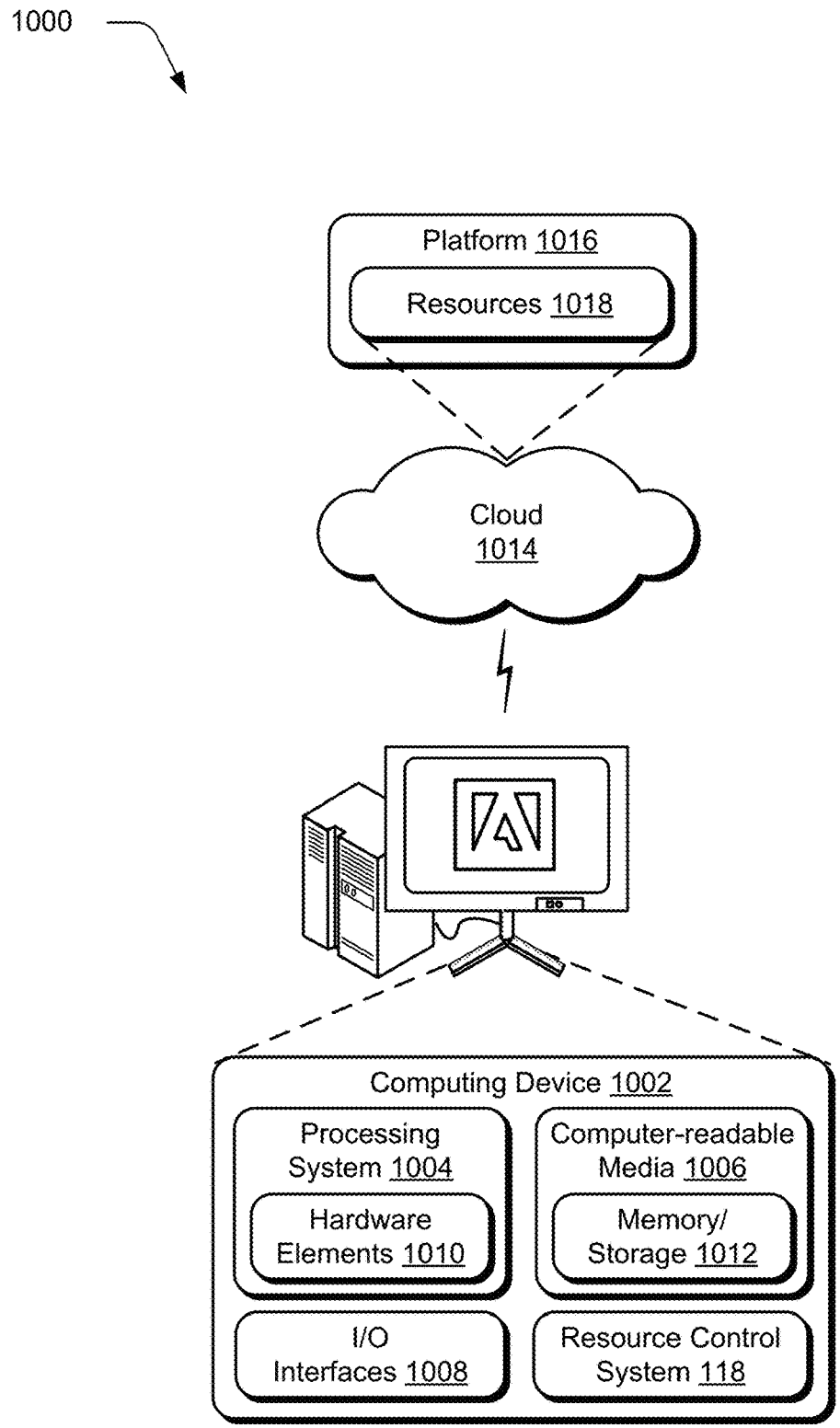
FIG. 10 illustrates an example system including various components of an example device that can be implemented as any type of computing device as described and/or utilize

FIG. 10 illustrates an example system generally at 1000 that includes an example computing device 1002 that is representative of one or more computing systems and/or devices that implement the various techniques described herein. This is illustrated through inclusion of the resource control system 118 of FIG. 1. The computing device 1002 is configurable, for example, as a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interface 1008 that are communicatively coupled, one to another. Although not shown, the computing device 1002 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware element 1010 that is configurable as processors, functional blocks, and so forth. This includes implementation in hardware as an application specific integrated circuit or other logic device formed using one or more semiconductors. The hardware elements 1010 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1006 is illustrated as including memory/storage 1012. The memory/storage 1012 represents memory/storage capacity associated with one or more computer-readable media. The memory/storage 1012 includes volatile media (such as random access memory (RAM)) and/or nonvolatile media (such as read only memory (ROM), Flash memory, optical disks, magnetic disks, and so forth). The memory/storage 1012 includes fixed media (e.g., RAM, ROM, a fixed hard drive, and so on) as well as removable media (e.g., Flash memory, a removable hard drive, an optical disc, and so forth). The computer-readable media 1006 is configurable in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1002. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1002, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 1010. The computing device 1002 is configured to implement particular instructions and/or functions corresponding to the software and/or hardware modules. Accordingly, implementation of a module that is executable by the computing device 1002 as software is achieved at least partially in hardware, e.g., through use of computer-readable storage media and/or hardware elements 1010 of the processing system 1004. The instructions and/or functions are executable/operable by one or more articles of manufacture (for example, one or more computing devices 1002 and/or processing systems 1004) to implement techniques, modules, and examples described herein.

The techniques described herein are supported by various configurations of the computing device 1002 and are not limited to the specific examples of the techniques described herein. This functionality is also implementable all or in part through use of a distributed system, such as over a "cloud" 1014 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 include applications and/or data that can be utilized while computer processing is executed on servers that are remote from the computing device 1002. Resources 1018 can also include services provided over the Internet and/or through a subscriber network, such as a cellular or Wi-Fi network.

The platform 1016 abstracts resources and functions to connect the computing device 1002 with other computing devices. The platform 1016 also serves to abstract scaling of resources to provide a corresponding level of scale to encountered demand for the resources 1018 that are implemented via the platform 1016. Accordingly, in an interconnected device embodiment, implementation of functionality described herein is distributable throughout the system 1000. For example, the functionality is implementable in part on the computing device 1002 as well as via the platform 1016 that abstracts the functionality of the cloud 1014.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium executable job scheduling environment, a resource control system comprising:
a handler module implemented by a computing device to obtain log data from a service provider system via a network, the log data describing status of compute instances of the service provider system in implementation of executable jobs;
a utility estimator module implemented by the computing device to compute job utility of the executable jobs based on the log data;
a time estimator module implemented by the computing device to estimate an amount of time for completion of the executable jobs, respectively, by the compute instances of the service provider system based on the log data; and
a scheduler module implemented by the computing device to generate actions to be performed by the compute instances in implementation of the executable jobs by the service provider system, the actions generated using machine learning by a machine-learning module based on the job utility and the amount of time.

2. The system as described in claim 1, wherein the compute instances of the service provider system are interruptible compute instances and the machine-learning module is configured to generate the action, at least in part, based on a probability of an interruption.

3. The system as described in claim 1, wherein the executable jobs are part of training a machine-learning model and the machine-learning module of the scheduler module is configured to optimize scheduling of the executable jobs based on respective improvements in a loss function used to train the machine-learning model.

4. The system as described in claim 1, wherein the compute instances of the service provider system include a first type that is uninterruptable and a second type that is interruptible and the machine-learning module is configured to generate the action based on the first and second types.

5. The system as described in claim 1, further comprising a deployment user interface module implemented by the computing device to receive job information identifying an input executable job and wherein the action schedules the execution of the input executable job by a respective said compute instance of the service provider system.

6. The system as described in claim 1, wherein the job utility is a function of job progress that quantifies a state relative to completion of the executable jobs, respectively, at the compute instances.

7. The system as described in claim 1, wherein the handler module is configured to receive the action from the scheduler module and communicate the action to the service provider system via a network.

8. The system as described in claim 1, wherein the handler module is configured to identify a respective said compute instance for execution of a respective said action by probing the service provider system.

9. The system as described in claim 8, wherein the probing includes transmitting a request to cause the service provider system to select the respective said compute instance based on a criterion.

10. The system as described in claim 9, wherein the criterion is specified in the request to minimize an amount of interruption or to maximize execution capacity.

11. In a digital medium executable job scheduling environment, a method implemented by a computing device, the method comprising:
generating, by the computing device, an action to be performed by a service provider system, the action generated using machine learning by a machine-learning module based on log data received from a service provider system;
identifying, by the computing device, a particular compute instance for execution of the action by probing the service provider system to indicate which compute instance of a pool of compute instances has a maximum capacity; and
communicating, by the computing device, the action for receipt by the service provider system via a network, the action configured to control execution of the action by the particular compute instance.

12. The method as described in claim 11, wherein the probing includes transmitting a request specifying a criterion to cause the service provider system to select the compute instance from the pool of compute instances.

13. The method as described in claim 12, wherein the criterion is to minimize an amount of interruption or to maximize execution capacity.

14. The method as described in claim 11, wherein the pool of compute instances are interruptible compute instances and the machine-learning module is configured to generate the action, at least in part, based on a probability of interruptions by respective said interruptible compute instances.

15. The method as described in claim 14, wherein at least one said interruption is caused by lifecycle management controlled by the service provider system.

16. The method as described in claim 11, wherein the machine-learning module is configured to generate the action based on reinforcement learning.

17. The method as described in claim 11, wherein the machine-learning module is configured to generate the action using a convex function implementing a convex optimizer.

18. The method as described in claim 11, wherein the action to be performed corresponds to an executable job of a plurality of executable jobs involving training a machine-learning model using machine learning and the generating the action is performed using a loss function configured to maximize total aggregate utility of the plurality of executable jobs.

19. The method as described in claim 11, further comprising:
computing job utility of the executable jobs based on the log data, the job utility computed as a function of job progress that quantifies a state of the executable jobs, respectively, used to train a machine-learning model; and
estimating an amount of time for completion of the executable jobs, respectively, by the compute instances of the service provider system, and wherein the generating of the actions is based on the job utility and the amount of time.

20. One or more computer-readable storage media having instructions stored thereon that, responsive to execution by a computing device, causes the computing device to perform operations including:
obtaining log data having instance status data of compute instances of a service provider system used to implement executable jobs to train a machine-learning model;

computing job utility of the executable jobs based on the log data, the job utility computed as a function of job progress that quantifies a state of the executable jobs, respectively, used to train the machine-learning model;

estimating an amount of time for completion of the executable jobs, respectively, by the compute instances of the service provider system;

generating actions to control the implementation of the executable jobs, the actions generated using machine learning by a machine-learning module based on the job utility, the amount of time, and a loss function configured to maximize total aggregate utility of the executable jobs by the compute instances on the training of the machine-learning model; and communicating the actions via a network to control the implementation of the executable job of respective said compute instances by the service provider system.

* * * * *